Nov. 22, 1955     L. P. WEIL     2,724,213

FLOWER HOLDERS

Filed Nov. 28, 1952

*INVENTOR.*
LEWIS P. WEIL
BY
J. T. Wolcensmith
ATTORNEY

2,724,213
FLOWER HOLDERS
Lewis P. Weil, Cynwyd, Pa.

Application November 28, 1952, Serial No. 322,961

2 Claims. (Cl. 47—41)

This invention relates to flower holders and more particularly to a holder for the exhibition of flowers in a liquid medium.

It is the principal object of the present invention to provide an improved holder for displaying flowers in an enclosed liquid medium.

It is a further object of the present invention to provide a flower holder in which the liquid display medium is effectively sealed so that no leakage can occur.

It is a further object of the present invention to provide a flower holder constructed to contain a liquid medium with a minimally sized air bubble entrained therein.

It is a further object of the present invention to provide a flower holder whose interior part is easily accessible for the placement of flowers.

Other objects and advantageous features of the present invention will be apparent from the specification and claims.

The nature and characteristic features of the invention will be more readily understood from the following description, taken in connection with the accompanying drawings forming part hereof, in which.

Figure 1:
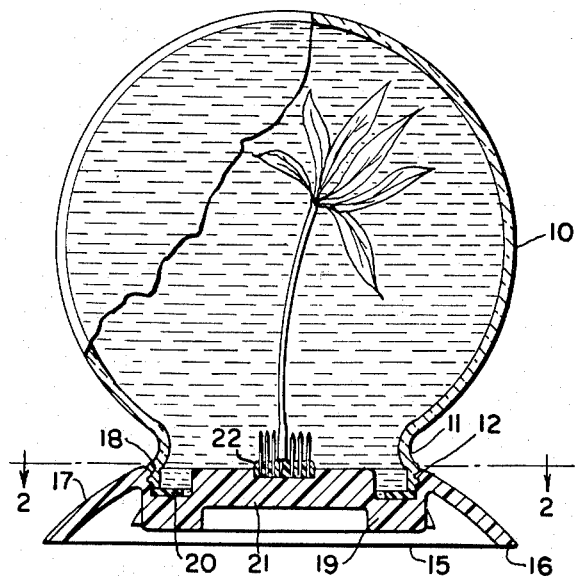
Figure 1 is a vertical view partly in elevation and partly in vertical section of a flower holder in accordance with the invention.
Figure 2:
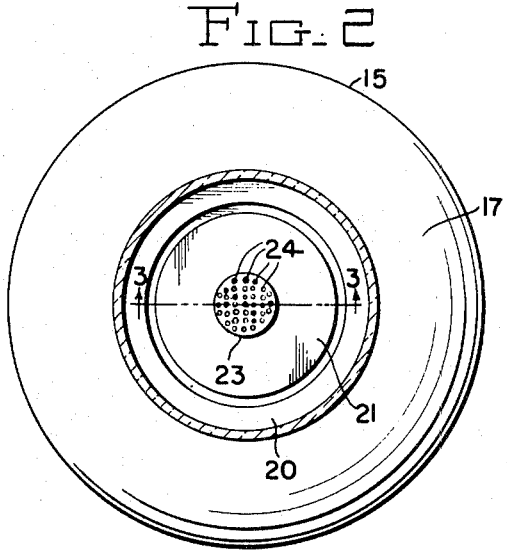
Fig. 2 is a horizontal sectional view taken approximately on the line 2—2 of Fig. 1.
Figure 4:
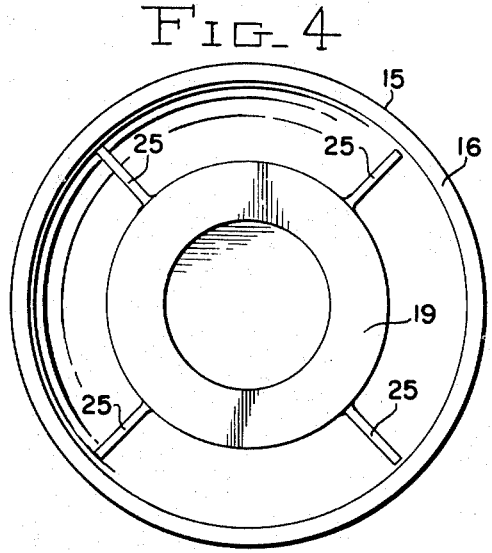
Fig. 4 is a bottom plan view of the flower holder shown in Fig. 1.
Figure 3:
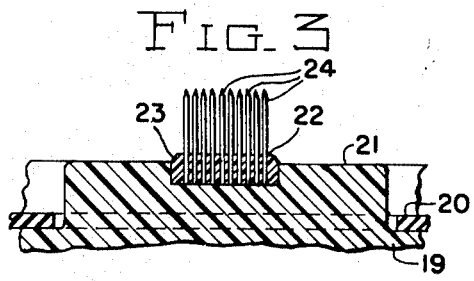
Fig. 3 is a vertical sectional view, enlarged, taken approximately on the line 3—3 of Fig. 2.

It should of course be understood that the description and drawings herein are illustrative merely, and that various modifications and changes may be made in the structure disclosed without departing from the spirit of the invention.

Like numerals refer to like parts throughout the several views.

Referring more particularly to the drawings, the flower holder, in accordance with the present invention, includes a transparent hollow container 10, preferably of a generally spherical configuration and of glass or synthetic plastic material. The container 10 is provided with a neck section 11 integral therewith having on the outermost end of its exterior surface a threaded portion 12 for purposes to be explained.

A closure 15 is provided, preferably of suitable synthetic plastic material and of a circular configuration having a lower edge face 16 for engagement with a supporting surface such as a table or the like (not shown) and an upwardly and inwardly curved base portion 17. The maximum horizontal diameter of the base portion is preferably substantially the same as that of the container 10. An internally threaded vertical cylindrical wall 18 is provided integral with the base portion 17 for engagement with the threaded portion 12 of the container 10. At the bottom of the wall 18 and integral therewith a circular flange 19 is provided extending inwardly for a short distance for the snug frictional reception of a resilient sealing member 20, a flat rubber ring being preferred. Within the area circumscribed by the flange 19 and integral therewith a cylindrical section 21 is provided having an axially cored cylindrical recess 22. A cylindrical holder 23 is provided, preferably of a synthetic plastic material of the polystyrene type, of the same approximate dimensions as the cored recess 22. The holder 23 is positioned in the cored recess 22 and is held in adherent engagement therein in any desired manner such as by a suitable waterproof cement.

Imbedded within the top part of the holder 23 a plurality of metal pins 24 is provided for supporting by impalement the flowers to be displayed. On the under side of the closure 15 in recessed integral relation therewith, a plurality of vertical rib members 25 may be provided in radial disposition with respect to the center of the closure to act as reinforcements for the closure 15 and also to present abutments to facilitate the assembly and disassembly of the closure 15 and container 10.

To assemble the flower holder for display, the desired flowers are first impaled on the metal pins 24 in a preferred arrangement. Then the container 10 is inverted, with the neck 11 uppermost, and is filled with a suitable fluid, such as water or a nutrient solution. The container 10 is filled to the uppermost marginal edge of the neck 11 with the fluid to be used.

The closure 15 with the flowers carried thereon is then inverted and the flowers inserted in the container 10 and the threaded portions 12 and 18 engaged and tightened to bring the outer margin of the neck 11 into sealed engagement with the sealing member 20.

As the cylindrical section 21 is inserted into the neck 11 of the container 10 it displaces a portion of the liquid in the container 10 and also tends to aid in the discharge of air to prevent entrapment of air in the container 10. As the threaded portions 12 and 18 are tightened, escape of air is also permitted until sealing by the ring 20 has been effected. The rib members 25 facilitate the assembly and disassembly of the flower holder by presenting suitable abutments to facilitate turning.

The assembled container 10 and closure 15 may then be inverted to an upright position for display and with no or very little entrapped air.

I claim:

1. A flower holder comprising a transparent container having a downwardly extending externally threaded neck, a one piece closure for said container having a supporting base flange section with outer edge portions extending outwardly beyond the outer extremities of said container, a vertical cylindrical threaded wall recessed within said base section and integral therewith for removable engagement with said threaded neck, a flange extending inwardly from the base of said threaded wall and integral therewith, a first elevated cylindrical section integral with said flange and extending inwardly within the neck of the container from the inner edge of said flange, the uppermost face of said cylindrical section being substantially in alinement with the uppermost portion of said vertical wall, said cylindrical section having an axially disposed cored section, a second raised section positioned within said cored section in fixed adherent engagement therein, the uppermost face of the said second section being higher than the said uppermost face of the said cylindrical section, and a plurality of pins fixedly imbedded in said second section.

2. A flower holder comprising a transparent container having a downwardly extending externally threaded neck, a one-piece closure for said container having a supporting base flange section with outer edge portions extending outwardly beyond the outer extremities of said container, a vertical cylindrical threaded wall recessed within said base section and integral therewith for removable engagement with said threaded neck, a flange extending inwardly from the base of said threaded wall, a first elevated cylindrical section integral with said flange and extending inwardly within the neck of the container from the inner edge of said flange, a plurality of manually accessible transverse rib portions above said edge portions connecting the interior of said base flange section with said flange, the uppermost face of said cylindrical section being substantially in alinement with the uppermost portion of said vertical wall, said cylindrical section having an axially disposed cored section, a second raised section positioned within said cored section in fixed adherent engagement therein, the uppermost face of the said second section being higher than the said uppermost face of the said cylindrical section, and a plurality of pins permanently imbedded in said second section.

References Cited in the file of this patent

UNITED STATES PATENTS

| | | |
|---|---|---|
| 84,445 | Stigale | Nov. 24, 1868 |
| 1,431,679 | Noda | Oct. 10, 1922 |
| 1,681,040 | Kemp | Aug. 14, 1928 |
| 1,741,692 | Garaja | Dec. 31, 1929 |
| 1,868,802 | Okai | July 26, 1932 |
| 2,601,658 | Bussert | June 24, 1952 |